United States Patent
Chawla et al.

(10) Patent No.: US 11,632,459 B2
(45) Date of Patent: Apr. 18, 2023

(54) SYSTEMS AND METHODS FOR DETECTING COMMUNICATION FRAUD ATTEMPTS

(71) Applicant: AGNITY Communications Inc., Fremont, CA (US)

(72) Inventors: Sanjeev Chawla, Fremont, CA (US); Hariom Sharma, Fremont, CA (US); Vishal Sharma, New Delhi (IN); Rajeev Arya, Ghaziabad (IN); Subhash Verma, New Delhi (IN)

(73) Assignee: AGNITY COMMUNICATIONS INC., Fremont, CA (US)

( * ) Notice: Subject to any disclaimer, the term of this patent is extended or adjusted under 35 U.S.C. 154(b) by 0 days.

(21) Appl. No.: 16/579,679

(22) Filed: Sep. 23, 2019

(65) Prior Publication Data
US 2020/0099781 A1    Mar. 26, 2020

Related U.S. Application Data

(60) Provisional application No. 62/736,058, filed on Sep. 25, 2018.

(51) Int. Cl.
*H04M 3/22* (2006.01)
*G10L 17/00* (2013.01)
*H04L 9/40* (2022.01)

(52) U.S. Cl.
CPC .......... *H04M 3/2281* (2013.01); *G10L 17/00* (2013.01); *H04L 63/304* (2013.01)

(58) Field of Classification Search
USPC .......................................................... 379/35
See application file for complete search history.

(56) References Cited

U.S. PATENT DOCUMENTS

| | | | |
|---|---|---|---|
| 8,774,785 B1 * | 7/2014 | Kirchhoff | H04M 1/7243 455/415 |
| 9,930,088 B1 * | 3/2018 | Hodge | H04L 65/4015 |
| 10,182,148 B2 * | 1/2019 | Winkler | H04M 3/42102 |
| 2006/0123083 A1 * | 6/2006 | Goutte | G06Q 10/107 709/206 |
| 2015/0288791 A1 * | 10/2015 | Weiss | H04M 1/663 379/189 |

* cited by examiner

*Primary Examiner* — Amal S Zenati
(74) *Attorney, Agent, or Firm* — ArentFox Schiff LLP

(57) ABSTRACT

The present disclosure provides a computer system, method, and computer-readable medium for a computer processor to detect, prevent and counter potentially fraudulent communications by proactively monitoring communications and performing multi-step analysis to detect fraudsters and alert communication recipients. The present disclosure may implement artificial intelligence (AI) algorithms to identify fraudulent communications. The AI model may be trained by real world examples to become more efficient.

19 Claims, 4 Drawing Sheets

SYSTEMS AND METHODS FOR DETECTING COMMUNICATION FRAUD ATTEMPTS

RELATED APPLICATIONS

This application claims the benefit of priority to U.S. Provisional Application No. 62/736,058, filed on Sep. 25, 2018, entitled "System and method for telephony fraud detection using multi-step call analysis," which is hereby incorporated by reference herein in its entirety.

FIELD OF THE TECHNOLOGY

Aspects of the disclosure relate to methods and systems for detection of attempted fraud in communications. The systems and methods may be used to detect, prevent and counter potentially fraudulent communications by blocking the communications and notifying the receiving parties of the attempted fraud, among other actions.

BACKGROUND

Potential fraudsters may target victims by pretending to be close relatives or friends undergoing trouble or distress. The intent of the fraudster may often be to emotionally trap the recipient of the communication, making the recipient believe that the fraudster is a close relative or friend in urgent need of money or other resources. In certain circumstances, fraudsters may also pose as government or other officials, requesting payment of a penalty or fine. Recipients/potential victims are often unable to recognize that the communication is potentially fraudulent, and may end up succumbing to the fraud attempt by providing money or other resources to the fraudster. This type of fraudulent practice is common nationally and internationally, and is difficult to detect, prevent and/or counter.

There is a need in the art, therefore, for methods and systems that effectively detect, prevent and counter potentially fraudulent communications.

SUMMARY

Aspects of the present disclosure provide methods and systems that effectively detect, prevent and counter potentially fraudulent communications by proactively monitoring communications and performing multi-step analysis to detect fraudsters and alert communication recipients (interchangeably referred to herein as victims or users) in real time. When a user is notified before and/or during the communication that the communication is potentially fraudulent, the user may become more alert during the communication, thus reducing the chance of succumbing to the attempted fraud. In accordance with some aspects, the methods and systems of the present disclosure may implement artificial intelligence (AI) algorithms to successfully identify the attempted fraud. In accordance with some variations, the AI model may be trained by real world examples so the system becomes more and more intelligent over a period of time, and fraud detection performance becomes more efficient.

In one aspect, the disclosure provides a method for detecting fraudulent communications by a computer processor. The method may include receiving an incoming communication, analyzing the received communication to determine whether it is fraudulent, upon determining that the received communication is fraudulent, blocking the communication or notifying the recipient, receiving feedback regarding the received communication from the recipient, and training an Artificial Intelligence (AI) model based on the feedback.

In another aspect, the disclosure provides a computer system for detecting fraudulent communications. The computer system may include a memory for storing executable instructions and a processor for executing the instructions communicatively coupled with the memory. The processor may be configured to receive an incoming communication, analyze the received communication to determine whether it is fraudulent, upon determining that the received communication is fraudulent, block the communication or notify the recipient, receive feedback regarding the received communication from the recipient, and train an Artificial Intelligence (AI) model based on the feedback.

In yet another aspect, the disclosure provides a non-transitory computer-readable medium storing computer executable instructions for detecting, by a computer processor executing the instructions, fraudulent communications. The non-transitory computer-readable medium may comprise code to receive an incoming communication, analyze the received communication to determine whether it is fraudulent, upon determining that the received communication is fraudulent, block the communication or notify the recipient, receive feedback regarding the received communication from the recipient, and train an Artificial Intelligence (AI) model based on the feedback.

These and other aspects of the disclosure will become more fully understood upon a review of the detailed description, which follows.

BRIEF DESCRIPTION OF THE DRAWINGS

The accompanying drawings together with the detailed description below, are incorporated in and form part of the specification, and serve to further illustrate aspects of the present disclosure, and explain various principles and advantages of those aspects.

The methods and systems disclosed herein have been represented where appropriate by conventional symbols in the drawings, showing only those specific details that are pertinent to understanding aspects of the disclosure so as not to obscure the disclosure with details that will be readily apparent to those of ordinary skill in the art having the benefit of the description herein.

DETAILED DESCRIPTION

In the following description, for purposes of explanation, numerous specific details are set forth in order to provide a thorough understanding of aspects of the disclosure. It will be apparent, however, to one skilled in the art, that aspects of the disclosure may be practiced without these specific details. In other instances, structures and devices are shown in block diagram form only in order to avoid obscuring the disclosure.

Aspects of the disclosure provide a solution for effectively detecting, preventing and countering potentially fraudulent communications by analyzing call attributes, voice biometrics and performing communication pattern and/or keyword analysis during the communication. The system may also record the communication and/or analyze a transcript of the communication, among other call attributes, which can be later used to train the AI model to improve fraud detection performance or to augment fraud related data for improved filtering.

In accordance with some aspects, the system may include an application server that deploys application logic to perform various steps of the call analysis, sending an alert notification to the user, receiving user feedback about fraud calls, augmenting fraud data from confirmed fraudulent calls, and training the AI algorithms using data collected for confirmed fraudulent and trustworthy (interchangeably referred to herein as legitimate or non-fraudulent) calls.

Figure 1:
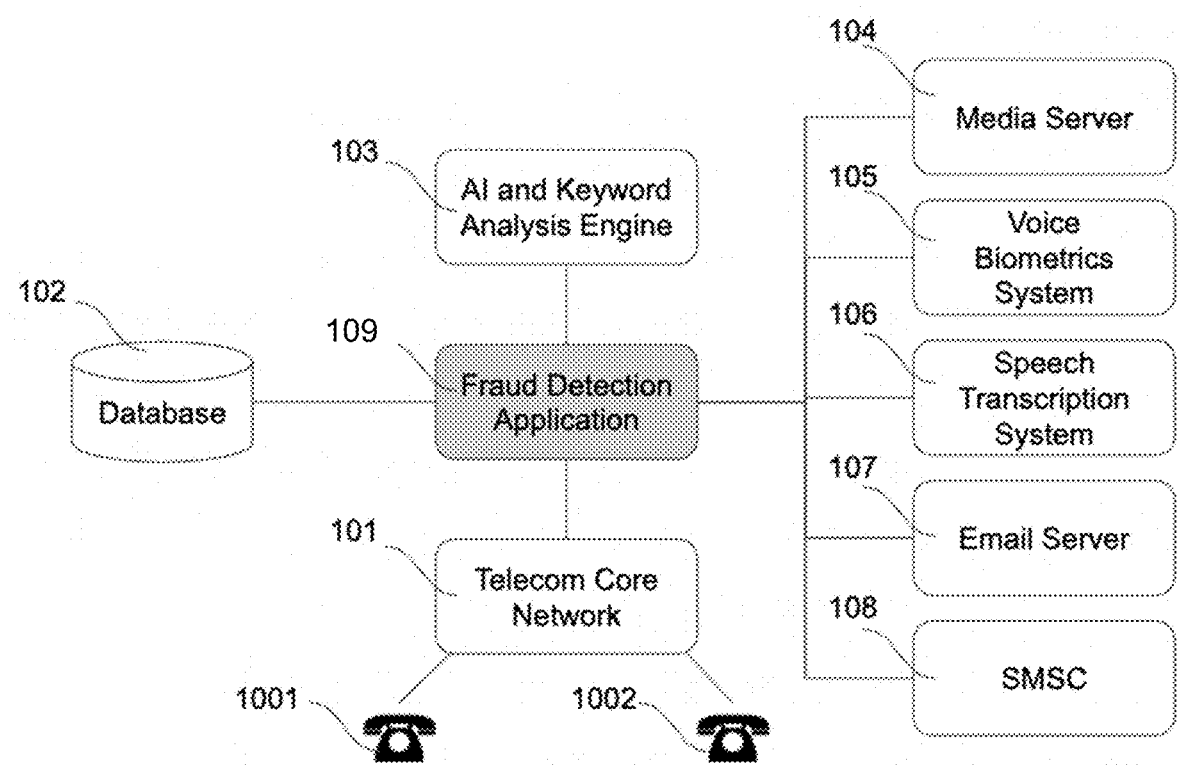
FIG. 1 shows an example system for fraud detection, in accordance with various aspects of the present disclosure.

Referring now to FIG. 1, therein shown is an example system for fraud detection 100, in accordance with various aspects of the present disclosure. As can be seen from FIG. 1, Fraud Detection Application 109 may receive a communication from Telecom Core Network 101 and may use a plurality of enabler modules 104, 105, 106, 107, 108 and database 102 to implement fraud detection system 100. The Fraud Detection Application 109 may apply end-to-end logic to implement various steps and methods for analysis of calls under investigation.

The Core Telecom Network 101 may connect to the Fraud Detection Application 109 over legacy SS7 or SIP (IMS, VoIP) interfaces, for example, and may forward the call to be monitored, initiated by calling party 1001 and directed to recipient 1002, for fraud detection to the Fraud Detection Application 109.

The Fraud Detection Application 109 may use Database 102 for accessing user information and fraud data collections such as blacklists and whitelists, for example. One or more databases 102 may also be used to store identified communications that may have been confirmed as fraudulent or non-fraudulent, as a result of feedback from notified users or other parties, for example.

The Fraud Detection Application 109 may implement an AI and Keyword Analysis Engine 103 for call pattern analysis using AI model and/or analysis of call through configurable keyword rules.

The Fraud Detection Application 109 may use Media Server 104 for recording communications, or portions thereof, for the purpose of obtaining voiceprint samples and/or for the purpose of transcribing the communications or portions thereof. The Media Server 104 may also be used for playback of announcements and collecting feedback through dual tone multi frequency (DTMF) digit inputs for recorded notifications, for example.

The Fraud Detection Application 109 may use Voice Biometrics System 105 for matching caller voiceprints with voiceprints in the blacklist or whitelist.

The Fraud Detection Application 109 may use Speech Transcription System 106 for conversion of real time call audio or recorded portions of a call into text, which may be input into AI and Keyword Analysis Engine 103 for further analysis.

The Fraud Detection Application 109 may use Mail Server 107 and SMSC 108 for sending email and SMS notifications to specified parties, for example.

Figure 2:
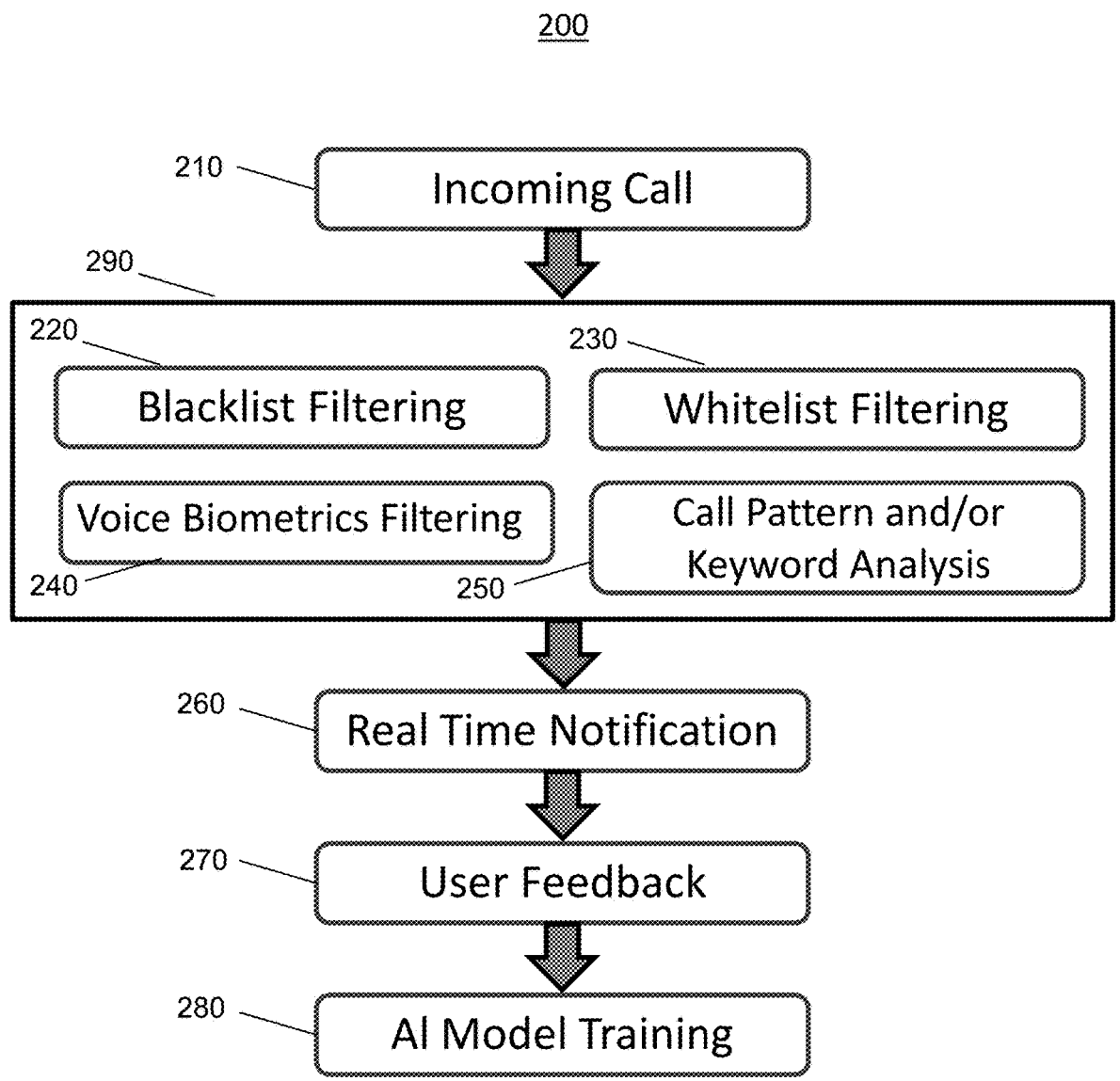
FIG. 2 shows an example method of analyzing a communication to determine whether it is potentially fraudulent.

Referring now to FIG. 2, therein shown is an example method 200 for analyzing a communication to determine whether it is potentially fraudulent. As shown in FIG. 2, upon receipt of an Incoming Call at block 210, the call may be subjected to a plurality of analysis steps at block 290 to determine whether the call is trustworthy, fraudulent or suspicious/undecided. The analysis steps, including, for example, Blacklist Filtering at block 220, Whitelist Filtering at block 230, Voice Biometrics Filtering at block 240 or Call Pattern and/or Keyword Analysis at block 250, may be performed in parallel or sequentially, in any order that may be suitable for a particular implementation, for example. Any suspicious/undecided calls identified at one step, may result in invocation of another step, for example. Calls deemed trustworthy may be permitted to connect. Calls identified as fraudulent may be blocked. Alternatively, the user/recipient or other configured parties may be notified of the fraudulent nature of the call at block 260, as per the preference of the use/recipient, at the time of call connection, during an ongoing call and/or after the call has ended. In some variations, an AI model may be implemented at block 280 to enable the system to learn to detect fraudulent calls more efficiently over time.

The analysis at block 290 may be followed by providing notification of the identified fraudulent calls to the user and/or other parties that have been specified to receive such notifications at block 260. Notified parties may be invited to provide feedback, at block 270, relating to suspicious calls via a hyperlink or option contained in the notifications, for example. Alternatively, notified parties may be invited to provide feedback at block 270 via other options. Upon receipt of user feedback may be identified as fraudulent or non-fraudulent depending on the received feedback.

In accordance with some aspects, voice transcripts, voice recordings, other call parameters and/or a combination thereof may be used to augment a fraud call parameter database and/or to train AI algorithms, at block 280, for improved detection of potentially fraudulent calls. In some aspects, the methods and systems of the present disclosure may be self-improving for more accurate detection of fraudulent calls.

In an example variation, the analysis step of Blacklist Filtering 220 may be applied to Incoming Call at block 210. It will be recognized by those of ordinary skill in the art that analysis steps at blocks 220, 230, 240 and 250 may be performed in any sequence or in parallel. For Blacklist Filtering at block 220, the system 100, shown in FIG. 1, may maintain a list of known fraudsters' telephone numbers in a global blacklist database. Additionally, the system 100 may also maintain a personal blacklist per user. When a call is received at block 210 and is subjected to the analysis step of Blacklist Filtering 220, the calling party telephone number may be checked against the global and personal blacklists. If a match occurs, the call may be dropped, and a courtesy announcement may be played for information to the recipient. Alternatively, the method may proceed to block 260, and provide real-time notification to the recipient.

If the call is allowed to proceed by Blacklist Filtering at block 220, it may be subjected to one or more of the analysis steps of Whitelist Filtering at block 230, Voice Biometrics Filtering at block 240 or Call Pattern and/or Keyword Analysis at block 250. If the call is found to be trustworthy at any of the steps at blocks 220, 230, 240 or 250, it may be directly connected.

In some aspects, for Whitelist Filtering at block 230, the system 100, shown in FIG. 1, may maintain a personal whitelist of telephone numbers per user that belong to contacts known to the user, such as family and friends. A whitelist at block 230 may be created by the user to include contacts known to the user, or may be generated by identifying frequently contacted numbers in the user's call patterns derived from analyzing historical call detail records (CDRs). The calling telephone number may be checked against the called user's personal whitelist. In case of a match, the call may be deemed trustworthy and may be allowed to connect. In some other aspects, a global whitelist of emergency and other official numbers may be maintained as a global whitelist. Communications originating from such numbers may be permitted to connected.

In some aspects, for Voice Biometrics Filtering at block 240, the system 100, shown in FIG. 1, may maintain a global blacklist of voice samples of known fraudsters. A voice sample may be recorded of a calling party, for example by way of recording a name, or a sample may be obtained from a call media stream after a suspicious call is connected. If the voice biometrics of the caller match the voice print of a known fraudster, the call may be deemed fraudulent and may be treated as a blacklisted call. In some aspects, users and/or authorized individuals may create personal whitelists of voice samples of known contacts, for example. If the voice sample of a calling party matches a voice print in the user's voice biometrics whitelist, it may be deemed trustworthy and may be permitted to connect.

In some aspects, Call Pattern Analysis and/or Keyword Analysis at block 250 may be performed in real time with or without recording calls, or portions thereof, using a transcription engine that outputs portions of text during an ongoing call or the full call transcript at the end of the call. In some aspects, a call transcript may be analyzed through a pre-trained AI model to identify fraudulent call patterns, such as unusual initial caller greetings, demand of bank account details, conversations about money transfers, and threats of fines or imposition of taxes, among other potentially fraudulent call patterns. Calls matching fraudulent call patterns may be deemed fraudulent and users and/or other specified parties may be notified accordingly at block 260, or the call may be blocked. In some aspects, the call transcripts may be input into a rule engine that has pre-specified rules based on occurrence and frequencies of a multitude of keywords and/or phrases. A call transcript matching one of the rules may be deemed fraudulent and users and/or other specified parties may be notified accordingly at block 260, or the call may be blocked. In one aspect, both AI-based Call Pattern Analysis and rule-based Keyword Analysis at block 250 may be performed sequentially or in parallel. This may be implemented when the AI Training Model at block 280 has not yet reached sufficient accuracy and may require additional data for further training. In such cases, the output from Keyword Analysis at block 250 may be considered final and the AI model output may be checked against that outcome. The AI Training Model at block 280 may be based on algorithms that can reinforce Keyword Analysis in real time. The call transcripts and/or recordings may be saved in transient memory or in database 102, as shown in FIG. 1, for example, for further training of the AI Training Model at block 280.

In some aspects, the AI Training Model 280 may be initially trained by sample example data, which could be from real world calls and/or manually created by using known fraud scripts. The AI Training Model 280 may be further refined by using confirmed fraudulent and non-fraudulent calls, identified by way of feedback from users or other notified parties. By its nature of assimilating new information based on identified call input data, AI Training Model at block 280 may become more efficient in fraud detection.

The analysis at block 290 may be followed by providing notification of the identified fraudulent calls to the user and/or other parties that have been specified to receive such notifications at block 260. Notified parties may be invited to provide feedback, at block 270, relating to suspicious calls via a hyperlink or other option contained in the notifications, for example. Alternatively, notified parties may be invited to provide feedback 270 via other means. Upon receipt of user feedback may be identified as fraudulent or non-fraudulent depending on the received feedback. Call data from confirmed fraudulent and non-fraudulent calls in User Feedback block 270 may be used in AI Model Training at block 280.

In some aspects, Real Time Notification at block 260 may be used to inform the user and/or other specified parties of an ongoing or just completed potentially fraudulent call. The notification can be in the form of in-call announcements or in the form of recorded voice notifications, or as SMS or email messages, among other means of notification. In some aspects, the notifications may have hyperlinks or DTMF input options, for example, for users to provide feedback at block 270 on whether the notified call is actually fraudulent or not. Other mechanisms, such as a telephone number to dial to provide feedback may also be provided. Upon feedback from the user or other notified parties, call data may be augmented for enhancing further fraud detection. One example may be including a fraudulent calling party telephone number in user's personal or global blacklist database. Another example may be including a sample of a calling party's voice in voice biometrics blacklist. In some aspects, the call transcripts of confirmed fraudulent and non-fraudulent are stored in database for training AI Training Model at block 280.

In accordance with some aspects, voice transcripts, voice recordings, other call parameters and/or a combination thereof may be used to augment a fraud call parameter database and/or to train AI algorithms, at block 280, for improved detection of potentially fraudulent calls. In some aspects, the methods and systems of the present disclosure may be self-improving for more accurate detection of fraudulent calls.

Aspects of the present disclosure may be implemented using hardware, software, or a combination thereof and can be implemented in one or more computer systems or other processing systems. In one aspect, the disclosure is directed toward one or more computer systems capable of carrying out the functionality described herein. An example of such a computer system 300 is shown in FIG. 3.

Figure 3:
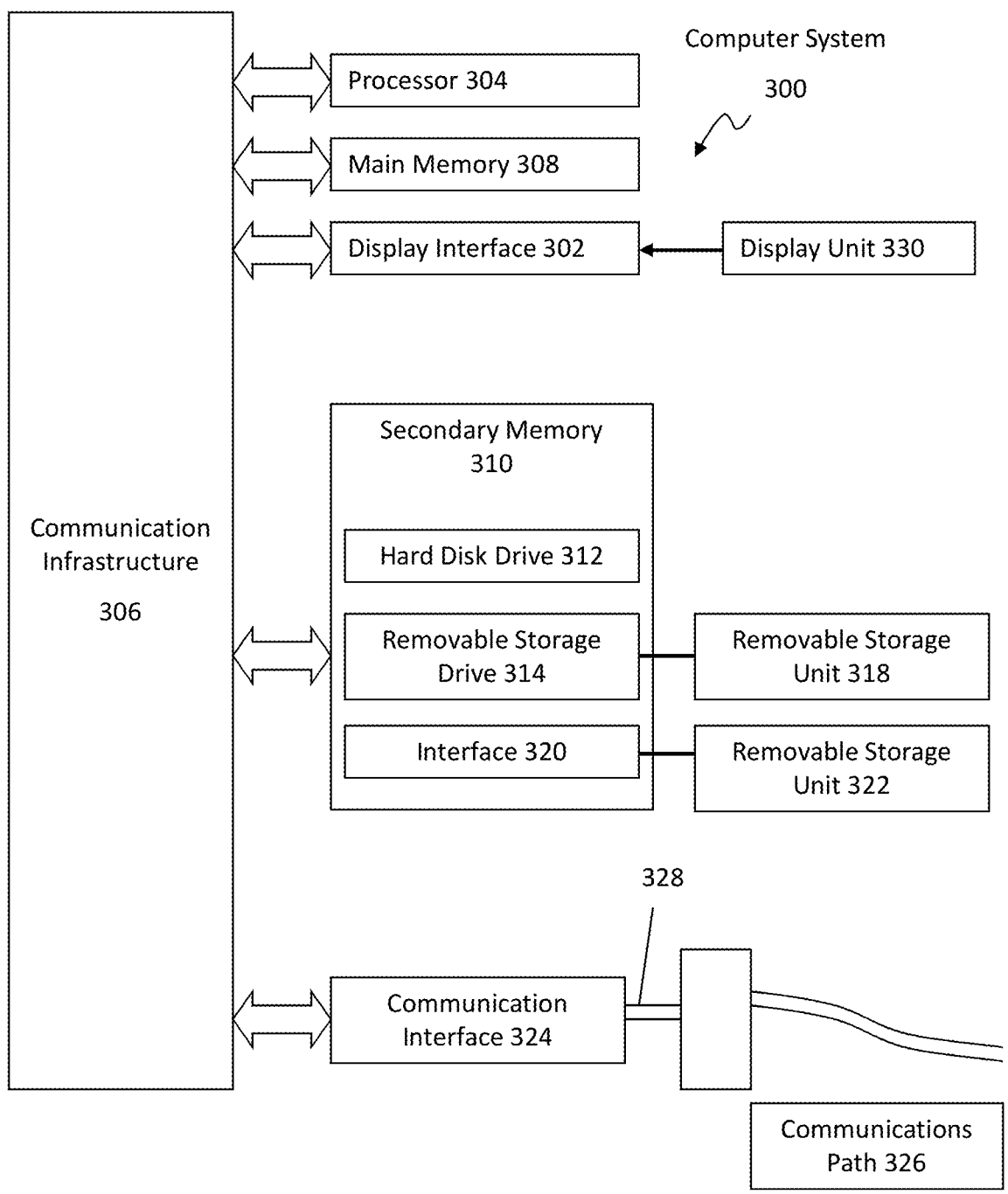
FIG. 3 shows an example system diagram of various hardware components and other features for use in accordance with aspects of the disclosure.

FIG. 3 presents an example system diagram of various hardware components and other features, for use in accordance with an aspect of the present disclosure. Aspects of the present disclosure can be implemented using hardware, software, or a combination thereof and can be implemented in one or more computer systems or other processing systems. In one example variation, aspects described herein can be directed toward one or more computer systems capable of carrying out the functionality described herein. An example of such a computer system 300 is shown in FIG. 3.

Computer system 300 includes one or more processors, such as processor 304. The processor 304 is connected to a communication infrastructure 306 (e.g., a communications bus, cross-over bar, or network). In one example, processor 120 can include processor 304. Various software aspects are described in terms of this example computer system. After reading this description, it will become apparent to a person skilled in the relevant art(s) how to implement aspects described herein using other computer systems and/or architectures. Computer system 300 can include a display interface 302 that forwards graphics, text, and other data from the communication infrastructure 306 (or from a frame buffer not shown) for display on a display unit 330. Computer system 300 also includes a main memory 308, preferably random access memory (RAM), and can also include a secondary memory 310. The secondary memory 310 can include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well-known manner. Removable storage unit 318, represents a floppy disk, magnetic tape, optical disk, etc., which is read by and written to removable storage drive 314. As will be appreciated, the removable storage unit 318 includes a computer usable storage medium having stored therein computer software and/or data.

In alternative aspects, secondary memory 310 can include other similar devices for allowing computer programs or other instructions to be loaded into computer system 300. Such devices can include, for example, a removable storage unit 322 and an interface 320. Examples of such can include a program cartridge and cartridge interface (such as that found in video game devices), a removable memory chip (such as an erasable programmable read only memory (EPROM), or programmable read only memory (PROM)) and associated socket, and other removable storage units 322 and interfaces 320, which allow software and data to be transferred from the removable storage unit 322 to computer system 300.

Computer system 300 can also include a communications interface 324. Communications interface 324 allows software and data to be transferred between computer system 300 and external devices. Examples of communications interface 324 can include a modem, a network interface (such as an Ethernet card), a communications port, a Personal Computer Memory Card International Association (PCMCIA) slot and card, etc. Software and data transferred via communications interface 324 are in the form of signals 328, which can be electronic, electromagnetic, optical or other signals capable of being received by communications interface 324. These signals 328 are provided to communications interface 324 via a communications path (e.g., channel) 326. This path 326 carries signals 328 and can be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 380, a hard disk installed in hard disk drive 370, and signals 328. These computer program products provide software to the computer system 300. Aspects described herein can be directed to such computer program products.

Computer programs (also referred to as computer control logic) are stored in main memory 308 and/or secondary memory 310. Computer programs can also be received via communications interface 324. Such computer programs, when executed, enable the computer system 300 to perform various features in accordance with aspects described herein. In particular, the computer programs, when executed, enable the processor 304 to perform such features. Accordingly, such computer programs represent controllers of the computer system 300.

In variations where aspects described herein are implemented using software, the software can be stored in a computer program product and loaded into computer system 300 using removable storage drive 314, hard disk drive 312, or communications interface 320. The control logic (software), when executed by the processor 304, causes the processor 304 to perform the functions in accordance with aspects described herein as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects described herein are implemented using a combination of both hardware and software.

Figure 4:
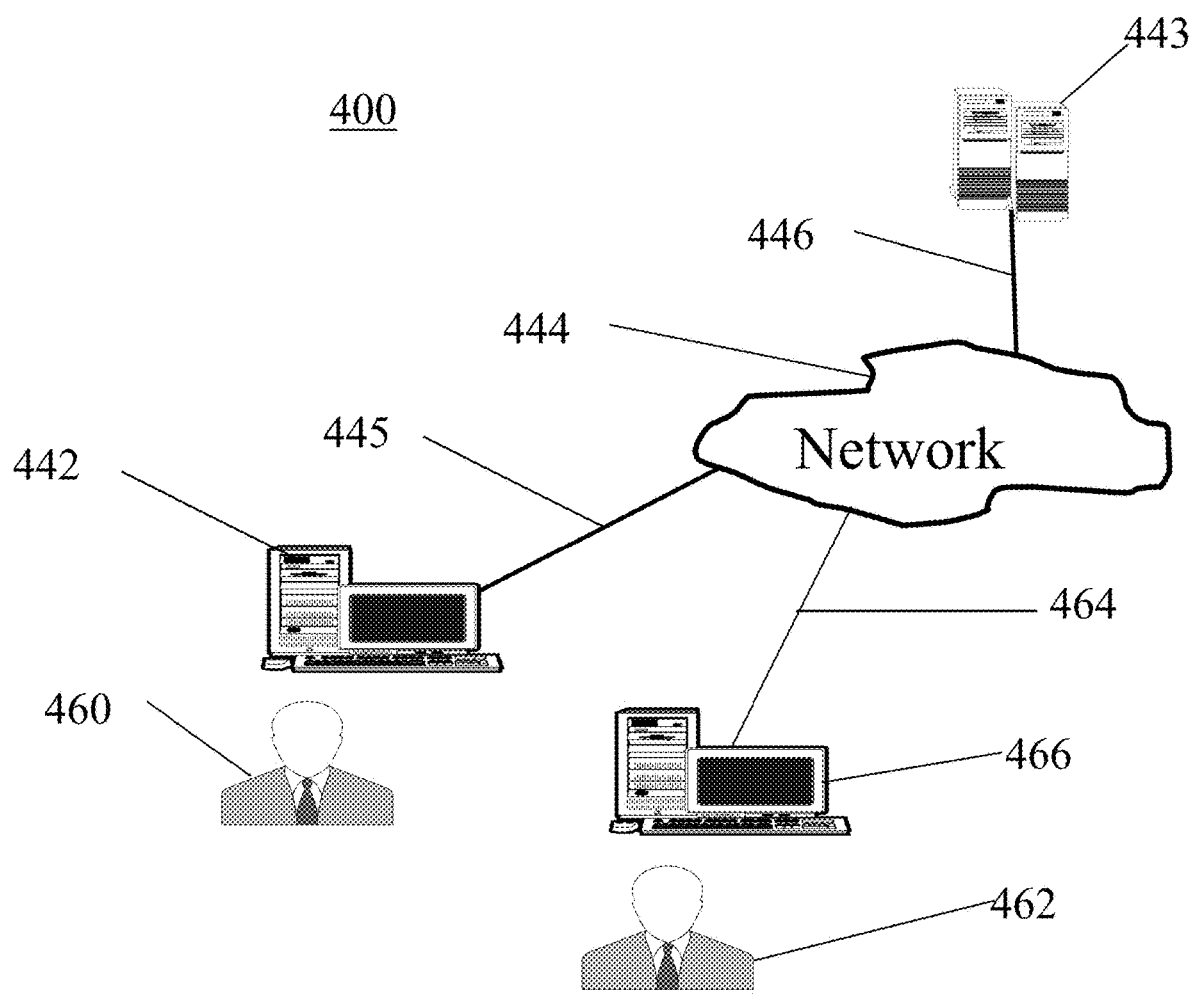
FIG. 4 shows a block diagram of various example system components for use in accordance with aspects of the disclosure.

FIG. 4 is a block diagram of various example system components, in accordance with an aspect. FIG. 4 shows a communication system 400 usable in accordance with various aspects described herein. The communication system 400 includes one or more accessors 460, 462 (also referred to interchangeably herein as one or more "users") and one or more terminals 442, 466. For example, terminals 442, 466 may include vehicle 102 or a related system (e.g., vehicle communication system 110, processor 120, communications device 124), remote device 104, and/or the like. In one aspect, data for use in accordance with aspects described herein is, for example, input and/or accessed by accessors 460, 462 via terminals 442, 466, such as personal computers (PCs), minicomputers, mainframe computers, microcomputers, telephonic devices, or wireless devices, such as personal digital assistants ("PDAs") or a hand-held wireless devices coupled to a server 443, such as a PC, minicomputer, mainframe computer, microcomputer, or other device having a processor and a repository for data and/or connection to a repository for data, via, for example, a network 444, such as the Internet or an intranet, and couplings 445, 446, 464. The couplings 445, 446, 1464 include, for example, wired, wireless, or fiberoptic links. In another example variation, the method and system in accordance with aspects described herein operate in a stand-alone environment, such as on a single terminal.

The aspects discussed herein can also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art which are also intended to be encompassed by the following claims.

What is claimed is:

1. A method for detecting fraudulent communications by a computer processor, the method comprising:
   receiving a voice call communication, wherein the voice call is an incoming voice call to a recipient;
   analyzing the voice call communication to determine whether it is fraudulent;

upon determining that the voice call communication is fraudulent, blocking the voice call communication or notifying the recipient;

receiving feedback regarding the voice call communication from the recipient;

training an Artificial Intelligence (AI) model based on keywords from the voice call communication, transcripts of the voice call communication, voice recordings of the voice call communication, and voice biometrics of known fraudsters; and updating the AI model based on the feedback from the recipient and the training of the AI model.

2. The method of claim 1, wherein analyzing the voice call communication to determine whether it is fraudulent further comprises performing a plurality of actions selected from a group consisting of blacklist filtering, whitelist filtering, voice biometrics filtering, and call pattern analysis.

3. The method of claim 2, wherein the call pattern analysis further comprises keyword analysis.

4. The method of claim 2, wherein the call pattern analysis further comprises analyzing call transcripts for fraudulent communication patterns.

5. The method of claim 1, wherein notifying the recipient further comprises providing a notification selected from a group consisting of an in-call announcements, a recorded voice notification, a SMS message, and an email message.

6. The method of claim 2, wherein the voice biometrics filtering further comprises comparing a voice sample of an originator of the voice call communication against a database of known voice samples, wherein the originator is different than the recipient.

7. A computer system for detecting fraudulent communications, comprising:
a memory for storing executable instructions; and
a processor for executing the instructions communicatively coupled with the memory, the processor configured to:
receive a voice call communication, wherein the voice call is an incoming voice call to a recipient;
analyze the voice call communication to determine whether it is fraudulent;
upon determining that the received voice call communication is fraudulent, block the voice call communication or notify the recipient;
receive feedback regarding the voice call communication from the recipient;
train an Artificial Intelligence (AI) model based on keywords from the voice call communication, transcripts of the voice call communication, voice recordings of the voice call communication, and voice biometrics of known fraudsters; and
update the AI model based on the feedback from the recipient and the training of the AI model.

8. The computer system of claim 7, wherein the processor is further configured to perform a plurality of actions selected from a group consisting of blacklist filtering, whitelist filtering, voice biometrics filtering, and call pattern analysis.

9. The computer system of claim 8, wherein the call pattern analysis further comprises keyword analysis.

10. The computer system of claim 8, wherein the call pattern analysis further comprises analyzing call transcripts for fraudulent communication patterns.

11. The computer system of claim 7, wherein the processor is further configured to provide a notification selected from a group consisting of an in-call announcements, a recorded voice notification, a SMS message, and an email message.

12. The computer system of claim 8, wherein the voice biometrics filtering further comprises comparing a voice sample of an originator of the voice call communication against a database of known voice samples, wherein the originator is different than the recipient.

13. A non-transitory computer-readable medium storing computer executable instructions for detecting, by a computer processor executing the instructions, fraudulent communications, the non-transitory computer-readable medium comprising code to:
receive a voice call communication, wherein the voice call is an incoming voice call to a recipient;
analyze the voice call communication to determine whether it is fraudulent;
upon determining that the voice call communication is fraudulent, block the voice call communication or notify the recipient;
receive feedback regarding the voice call communication from the recipient;
train an Artificial Intelligence (AI) model based on keywords from the voice call communication, transcripts of the voice call communication, voice recordings of the voice call communication, and voice biometrics of known fraudsters; and
update the AI model based on the feedback from the recipient and the training of the AI model.

14. The non-transitory computer-readable medium of claim 13, further comprising code to perform a plurality of actions selected from a group consisting of blacklist filtering, whitelist filtering, voice biometrics filtering, and call pattern analysis.

15. The non-transitory computer-readable medium of claim 14, wherein the call pattern analysis further comprises keyword analysis.

16. The non-transitory computer-readable medium of claim 14, wherein the call pattern analysis further comprises analyzing call transcripts for fraudulent communication patterns.

17. The non-transitory computer-readable medium of claim 13, further comprising code to provide a notification selected from a group consisting of an in-call announcements, a recorded voice notification, a SMS message, and an email message.

18. The non-transitory computer-readable medium of claim 14, wherein the voice biometrics filtering further comprises comparing a voice sample of an originator of the voice call communication against a database of known voice samples, wherein the originator is different than the recipient.

19. The method of claim 1, wherein upon determining that a voice call communication is fraudulent, saving a voice biometric sample of a calling party of the voice call to a blacklist of known fraudsters.

* * * * *